(12) United States Patent
Carr (10) Patent No.: US 12,505,231 B2
(45) Date of Patent: Dec. 23, 2025

(54) SYSTEMS AND METHODS FOR PERFORMING DISTRIBUTED COMPUTING

(71) Applicant: DELEASE, LLC, Tampa, FL (US)

(72) Inventor: Matthew Carr, Tampa, FL (US)

(73) Assignee: DELEASE, LLC, Tampa, FL (US)

( * ) Notice: Subject to any disclaimer, the term of this patent is extended or adjusted under 35 U.S.C. 154(b) by 238 days.

(21) Appl. No.: 18/166,376

(22) Filed: Feb. 8, 2023

(65) Prior Publication Data

US 2024/0264752 A1 Aug. 8, 2024

(51) Int. Cl.
*H04L 9/06* (2006.01)
*G06F 21/60* (2013.01)
*H04L 9/32* (2006.01)

(52) U.S. Cl.
CPC .................................. *G06F 21/602* (2013.01)

(58) Field of Classification Search
CPC .................................................... G06F 21/602
USPC ......................................................... 713/193
See application file for complete search history.

(56) References Cited

U.S. PATENT DOCUMENTS

| | | | |
|---|---|---|---|
| 8,832,466 B1 | 9/2014 | McGregor, Jr. et al. | |
| 9,361,406 B1 * | 6/2016 | Taropa | G06N 7/01 |
| 9,852,231 B1 * | 12/2017 | Ravi | G06F 16/9024 |
| 10,169,711 B1 * | 1/2019 | Dean | H04L 67/535 |
| 10,715,323 B2 | 7/2020 | Chan et al. | |
| 11,030,187 B1 | 6/2021 | Boodman et al. | |
| 11,108,753 B2 | 8/2021 | Murray | |
| 11,151,236 B2 | 10/2021 | Nandakumar et al. | |
| 11,265,171 B2 | 3/2022 | Struttmann et al. | |
| 2003/0126085 A1 | 7/2003 | Srinivasan | |
| 2017/0250827 A1 | 8/2017 | Opschroef et al. | |
| 2020/0084213 A1 * | 3/2020 | Taropa | G06F 16/93 |
| 2020/0412525 A1 | 12/2020 | Katsak et al. | |
| 2021/0182837 A1 * | 6/2021 | Sears | G06Q 20/367 |
| 2021/0311924 A1 * | 10/2021 | Tian | G06F 16/2315 |
| 2022/0138766 A1 * | 5/2022 | Zhou | G06Q 30/0205 |
| | | | 705/7.34 |
| 2022/0284432 A1 * | 9/2022 | Papantoniou | H04L 63/0823 |
| 2023/0185767 A1 * | 6/2023 | Hung | G06F 16/152 |
| | | | 713/189 |

(Continued)

FOREIGN PATENT DOCUMENTS

| | | | | |
|---|---|---|---|---|
| AU | 2018221097 A1 * | 8/2019 | .......... | G06F 11/1004 |
| CA | 3061603 A1 * | 5/2020 | .......... | H04L 9/0643 |
| CA | 3164259 A1 * | 7/2021 | .......... | G06F 16/219 |

(Continued)

*Primary Examiner* — Haresh N Patel
(74) *Attorney, Agent, or Firm* — Evergreen Valley Law Group; Kanika Radhakrishnan (57) ABSTRACT

Embodiments of the present disclosure provide systems and methods for organizing information and one or more computing devices into a hierarchical tree structure. The system includes a memory storing a root directory configured to store an identifier of an owner of the hierarchical tree structure. In addition, the system includes one or more registers storing one or more data blocks configured to store the information. The one or more data blocks include at least one of: files and directories. The system further includes one or more servers to represent the one or more computing devices. Furthermore, the system includes one or more processors configured to run one or more processes on the one or more servers.

9 Claims, 7 Drawing Sheets

(56) References Cited

U.S. PATENT DOCUMENTS

| | | | | |
|---|---|---|---|---|
| 2024/0256699 A1* | 8/2024 | Scrivano | ............... | G06F 21/64 |
| 2024/0264752 A1* | 8/2024 | Carr | ..................... | G06F 21/602 |

FOREIGN PATENT DOCUMENTS

| | | | | | |
|---|---|---|---|---|---|
| CN | 110163007 | A | * | 8/2019 | ........... G06F 21/602 |
| CN | 110795439 | A | * | 2/2020 | ............ G01C 21/36 |
| CN | 111316267 | A | * | 6/2020 | ............ G06F 21/31 |
| CN | 111417946 | A | * | 7/2020 | ........ G06F 21/6218 |
| CN | 111258508 | B | * | 11/2020 | |
| CN | 109145053 | B | * | 3/2021 | ........... G06F 9/5027 |
| CN | 112528341 | A | * | 3/2021 | ............ G06F 21/45 |
| CN | 109508563 | B | * | 11/2021 | ............ G06F 21/64 |
| CN | 113626456 | A | * | 11/2021 | |
| CN | 113839863 | A | * | 12/2021 | |
| CN | 115134089 | A | * | 9/2022 | |
| CN | 115544040 | A | * | 12/2022 | |
| CN | 115695439 | A | * | 2/2023 | |
| EP | 4044501 | A1 | | 8/2022 | |
| EP | 4095731 | A1 | * | 11/2022 | ........... G06F 21/602 |
| ES | 2774397 | A1 | * | 7/2020 | ............ H04L 9/0637 |
| GB | 2606195 | A | * | 11/2022 | ............ G06F 16/22 |
| KR | 101968418 | B1 | | 4/2019 | |
| KR | 102294048 | B1 | * | 8/2021 | |
| WO | WO-2018200185 | A1 | * | 11/2018 | ........ G06F 16/2228 |
| WO | WO-2019158209 | A1 | * | 8/2019 | ........... G06F 21/604 |
| WO | WO-2021061090 | A1 | * | 4/2021 | ........... G06F 11/006 |
| WO | 2022169663 | A1 | | 8/2022 | |
| WO | WO-2023280721 | A1 | * | 1/2023 | ............. G16B 50/30 |

\* cited by examiner

SYSTEMS AND METHODS FOR PERFORMING DISTRIBUTED COMPUTING

TECHNICAL FIELD

The present disclosure relates to distributed data processing systems and, more particularly relates, to systems and methods for performing distributed computing.

BACKGROUND

Over the last few years, there is an increase in the demand of distribution of data. In many cases, the data needs to be distributed across various geographical boundaries, and in multiple formats. This can be achieved with facilitation of the distributed computing. Generally, distributed computing is a field of computer science that deals with distributed systems. In addition, a distributed system may relate to a system whose components are located on different networked computers, which communicate and coordinate their actions by passing messages to one another from any system.

Although various distributed computing techniques exist today, these techniques have significant limitations. In recent years, user devices have become quite capable, in terms of computation as well as storage. This provides new challenges and opportunities for web designers, as latency has become the bottleneck to delivering acceptable experiences in interactive applications. Due to the fundamental limit put on communication by the speed of light, the only solution to this problem is to move data closer to the user. Moreover, it has become a requirement to ensure the integrity and confidentiality of user data, along with its replication.

SUMMARY

Various embodiments of the present disclosure provide systems and methods to perform distributed computing.

In an aspect, a system for organizing information and one or more computing devices into a hierarchical tree structure is disclosed. The system includes a root directory to store an identifier associated with an owner of the hierarchical tree structure. In addition, the system further includes one or more registers storing one or more data blocks. The one or more data blocks are configured to store the information. The one or more data blocks include at least one of: files and directories. Further, the system includes one or more servers to represent the one or more computing devices. Furthermore, the system includes one or more processors configured to run one or more processes on the one or more servers.

In another aspect, a computer-implemented method for performing distributed computing based on a system for organizing information and one or more computing devices into a hierarchical tree structure (blocktree) is disclosed. The system includes one or more data blocks configured to store the information. The one or more data blocks include at least one of: files and directories. In addition, the system includes one or more servers to represent the one or more computing devices. Further, the system includes a read module configured to enable read access to the one or more data blocks and the one or more servers. Furthermore, the system includes a write module configured to enable write access to the one or more data blocks and the one or more servers, wherein the read access and the write access are enabled based, at least in part, on cryptographic operations. The method includes receiving a request from a process to perform an input/output (IO) operation on the one or more data blocks. The method further includes opening the one or more data blocks. Furthermore, the method includes optionally performing a read operation on the one or more data blocks based, at least in part, on readcaps associated with the one or more data blocks. Moreover, the method includes optionally performing a write operation on the one or more data blocks based, at least in part, on writecaps associated with the one or more data blocks.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "distributed system" used throughout the description, may correspond to a computing environment in which various components are spread across multiple computers (or other computing devices) on a network. In other words, a distributed system may include various nodes that are physically separate but linked together using the network.

The term "distributed computing" used throughout the description, may relate to a method of enabling various computing systems to work together to solve a common problem. For example, a distributed computing system may consist of various software components that are on multiple computers but run as a single system. In particular, distributed computing may refer to a field of computer science that studies distributed systems.

Various embodiments of the present disclosure provide a system and method to perform distributed computing. In particular, the present disclosure provides a system for organizing information and one or more computing devices (e.g., user devices) associated with a user into a hierarchical tree structure. The tree structure is herein referred to as a "blocktree". The information is stored in the blocktree in data structures herein termed as data blocks. In addition, the one or more computing devices that store the information and/or the data structures are herein termed as servers. Further, the servers store the data blocks which are descended from their parent. Furthermore, read and write access to the data blocks and access to the servers may be implemented based on cryptographic operations.

As discussed above, it has become a task for the developers of web applications to ensure the integrity and confidentiality of user data, along with replicating it. This not only leads to higher development costs, but also more frequent software defects which can lead to data loss, or even worse, a data breach.

Conventional systems similar to blocktree (such as InterPlanetary File System (IPFS), Web Native File System (WNFS), etc.) focus on using content-addressing to identify files, which inevitably leads to coupling with mutable naming systems, such as DNS. In addition, such systems fail to provide a mechanism for managing the locality of data, and thus fail to meet the latency requirements that practical systems must deliver.

To overcome the above-mentioned drawbacks, various embodiments of the present disclosure provide a system for controlling which servers store which data and allowing programs to control this with a file system interface.

In other words, various embodiments of the present disclosure provide a platform for building distributed systems i.e., blocktree. In some implementations, the blocktree provides at least: (1) a file system Application Programming Interface (API), with Network File System (NFS) like consistency guarantees, and (2) a messaging system, including pub/sub events, addressed using the same path as those in the file system.

In an embodiment, the blocktree is implemented as a user-space application for compatible operating systems. In an example, the file system interface is exposed to other programs based on a FUSE server. It is noted that it is more efficient to implement the system in the operating system kernel but requiring a custom kernel to be installed just to use the system would be an absurdly high barrier to entry.

The user applications (e.g., decentralized applications) for the blocktree can be distributed either as container images holding native code or WebAssembly modules. The distributed file system provided by the blocktree is used as a decentralized package repository. The integrity guarantees provided by the distributed file system (i.e., blocktree based) ensure that any software package delivered using it has not been modified by an attacker in between. The package containing the core blocktree daemons is distributed as a container image, allowing the platform to handle its own updates.

The system enforces read and write permissions based at least on cryptographic operations. In particular, every file system object in the blocktree has system-managed metadata. The metadata is used to control access to its individual encryption key. This individual encryption key can be rotated by simply re-writing the metadata, with no need to securely distribute the new key. The system achieves write integrity by maintaining a Merkle tree over the contents of each file and directory. The root of the Merkle tree is stored in the metadata of a file system object. This metadata is then signed using a digital signature scheme.

This signature can then be verified using a certificate chain already stored in the metadata. The root of this certificate chain must contain a public key that hashes to the first component of the path of the file system object. Thus, the first path component specifies the owner of the file system object. By issuing a certificate, the owner is able to provide the capability to write to all files contained in a particular path. The principal receiving this capability can then issue a new capability that is scoped to an even more specific path, allowing capabilities to be delegated.

Various embodiments of the present disclosure are described hereinafter with reference to FIGS. 1 to 9.

Figure 1:
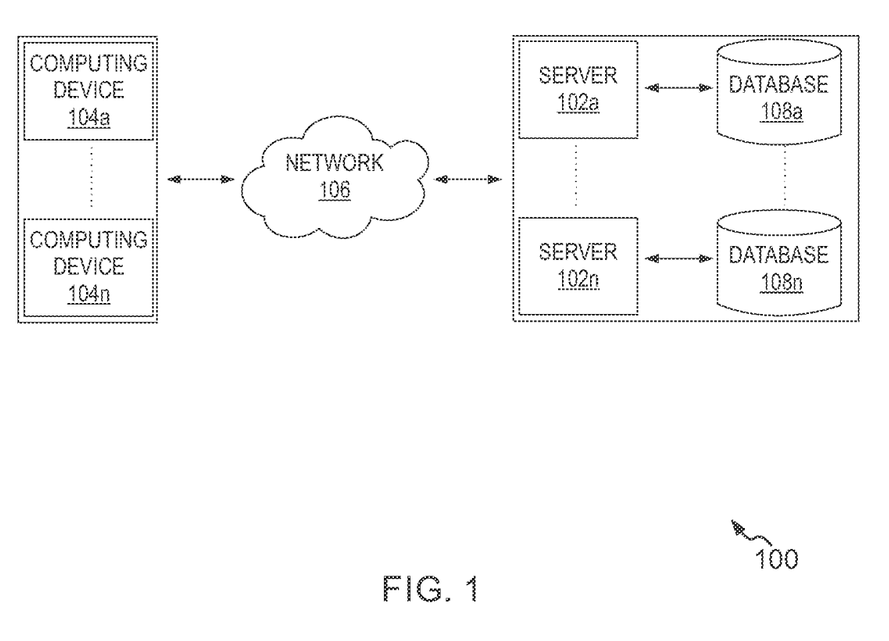
FIG. 1 illustrates an exemplary representation of an environment related to at least some embodiments.

FIG. 1 illustrates an exemplary representation of an environment 100 related to at least some embodiments. Although the environment 100 is presented in one arrangement, other embodiments may include the parts of the environment 100 (or other parts) arranged otherwise depending on, for example, enabling distributed computing, etc. The environment 100 generally includes servers 102*a*, 102*b*, . . . , 102*n* (can be represented as servers 102*a*-102*n*)

and one or more computing devices 104a, 104b, . . . , 104n (can be represented as computing devices 104a-104n), each coupled to, and in communication with (and/or with access to) a network 106. The network 106 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 106 in accordance with various wired and wireless communication protocols, such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. In some instances, the network 106 may include a secure protocol (e.g., Hypertext Transfer Protocol Secure (HTTPS)), and/or any other protocol, or set of protocols.

The servers 102a-102n and the computing devices 104a-104n may communicate with each other to implement the distributed computing architecture. The term "distributed computing" herein may refer to the environment 100 in which the components of a software system (e.g., distributed applications) are shared among the servers 102a-102n and the computing devices 104a-104n. The servers 102a-102n may communicate with each other and/or with the computing devices 104a-104n via message passing. In an embodiment, the servers 102a-102n represent the computing devices 104a-104n.

In an implementation, the servers 102a-102n and the computing devices 104a-104n may be located at a single location. In another implementation, the servers 102a-102n and the computing devices 104a-104n may be located at various locations. In one example, the distributed computing environment may represent an integrated set of services and tools which can be used for building and/or running distributed applications (DApps).

In general, a server may represent a computer program or device that provides a service to another computer program and its user. In general, the computing device may represent a standalone unit or several interconnected units. In an example, the computing devices 104a-104n may be associated with a single user. In another example, the computing devices 104a-104n may be associated with various users.

With reference to FIG. 1, the servers 102a-102n are communicably coupled to databases 108a-108n. The databases 108a-108n may provide a storage location for the information and/or data associated with the servers 102a-102n. In an implementation, each individual database (e.g., the database 108a) is associated with each individual server (e.g., the server 102a).

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
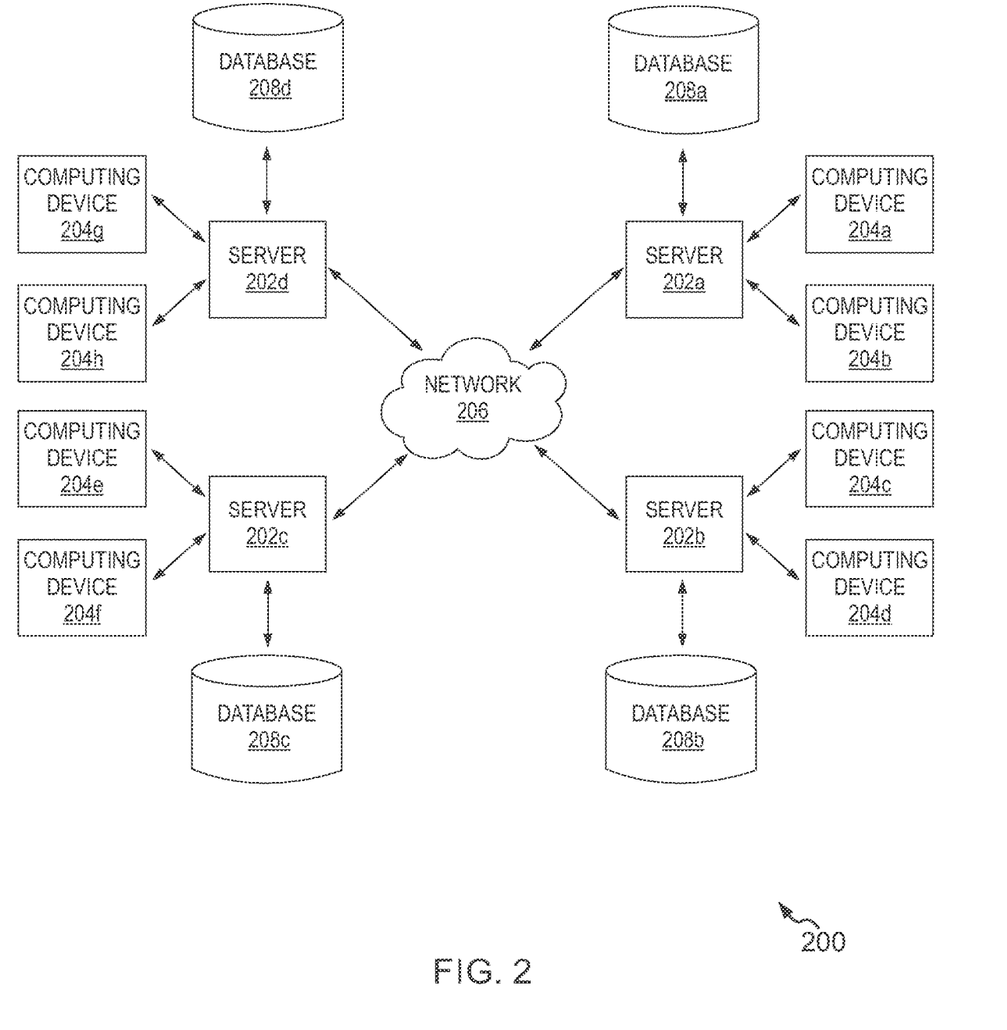
FIG. 2 illustrates another exemplary representation of an environment related to at least some embodiments.

FIG. 2 illustrates another exemplary representation of an environment 200 related to at least some embodiments. Although the environment 200 is presented in one arrangement, other embodiments may include the parts of the environment 200 (or other parts) arranged otherwise depending on, for example, enabling distributed computing, etc. The environment 200 generally includes servers 202a, 202b, 202c, and 202d, each coupled to, and in communication with (and/or with access to) a network 206. The network 206 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 2, or any combination thereof.

Various entities in the environment 200 may connect to the network 206 in accordance with various wired and wireless communication protocols, such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. In some instances, the network 206 may include a secure protocol (e.g., Hypertext Transfer Protocol Secure (HTTPS)), and/or any other protocol, or set of protocols.

In addition, the environment 200 includes computing devices 204a, 204b, 204c, 204d, 204e, 204f, 204g, and 204h. As shown in FIG. 2, the computing devices 204a and 204b are associated with the server 202a, the computing devices 204c and 204d are associated with the server 202b, the computing devices 204e and 204f are associated with the server 202c, and the computing devices 204g and 204h are associated with the server 202d.

The servers 202a-202d communicate with each other to implement the distributed computing architecture. The servers 202a-202d may communicate with each other and/or with the computing devices 204a-204h via message passing.

In an implementation, the servers 202a-202d and the computing devices 204a-204h may be located at a single geographical location. In another implementation, the servers 202a-202d and the computing devices 204a-204h may be located at various geographical locations.

With reference to FIG. 2, the servers 202a-202d are communicably coupled to databases 208a-208d. The databases 208a-208d provide storage location to the information and/or data associated with the servers 202a-202d. In an implementation, each individual database (e.g., the database 208a) is associated with each individual server (e.g., the server 202a).

The number and arrangement of systems, devices, and/or networks shown in FIG. 2 are provided as an example. There may be additional systems, devices, and/or networks; fewer systems, devices, and/or networks; different systems, devices, and/or networks, and/or differently arranged systems, devices, and/or networks than those shown in FIG. 2. Furthermore, two or more systems or devices shown in FIG. 2 may be implemented within a single system or device, or a single system or device shown in FIG. 2 may be implemented as multiple, distributed systems or devices. Additionally, or alternatively, a set of systems (e.g., one or more systems) or a set of devices (e.g., one or more devices) of the environment 200 may perform one or more functions described as being performed by another set of systems or another set of devices of the environment 200.

Figure 3A:
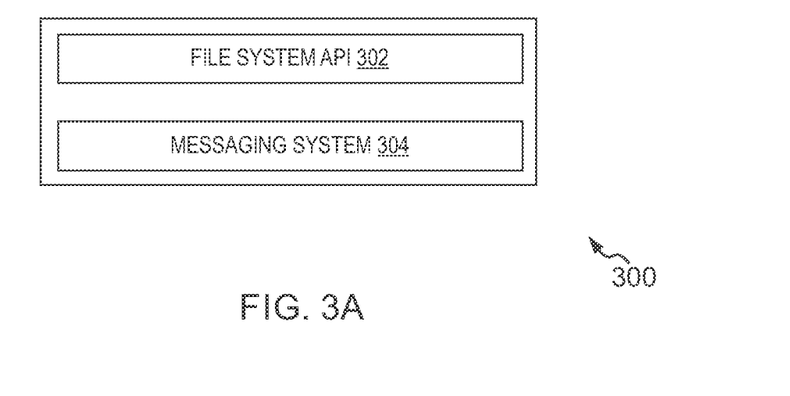
FIG. 3A is a block diagram representation of a distributed computing architecture, in accordance with various embodiments of the present disclosure.

FIG. 3A is a block diagram representation 300 of a distributed computing architecture, in accordance with various embodiments of the present disclosure.

The block diagram representation 300 includes a file system Application Programming Interface (API) 302, and a messaging system 304. The distributed computing architecture enables interoperability between the decentralized applications (DApps). Generally, DApps represent digital applications or programs that exist and run on a network of computers instead of a single computer. In an example, the file system API 302 may represent Portable Operating System Interface (POSIX) file system API.

The distributed computing architecture is implemented based at least in part on the blocktree. In particular, the blocktree provides the file system API 302 to applications (i.e., DApps) which allow them to control the encryption and authentication of data, and even the server (e.g., the server 102a) storing it. The blocktree provides a unified global namespace, where data is distributed among a tree of servers (e.g., the servers 102a-102n). The blocktree also provides an asynchronous messaging interface to DApps, making it very easy to port distributed systems designed around the actor model to it. The file system API 302 supports sub/sub messaging and is addressed using the same paths used for file system operations, because the servers 102a-102n are themselves objects in the file system. The servers 102a-102n contained in a directory are responsible for storing the data in that directory. The servers 102a-102n run a consensus algorithm to synchronize writes to the data in their directory. Thus, many other data replication schemes can be constructed based at least on the blocktree.

In traditional single-server network file systems (e.g., Network File System (NFS), Common Internet File System (CIFS), etc.), a single server is responsible for storing all the data. There are tools for increasing the reliability and read performance of such systems (read-only replicas), but these approaches cannot scale the write performance beyond the capabilities of a single server. In one example, by partitioning the write traffic over a tree of servers, networks can be built that can scale to the traffic as per our requirement.

However, the blocktree is not static. The blocktree can be changed dynamically without taking down servers or disrupting the services they provide. This, in turn, allows the computing resources to be added as they are required, and fail-overs to occur when they go down. The blocktree enables data replication by exposing a write event for files and directories. In one example, when a server is subscribed to a file's write event, it receives messages including completed write transactions, which it uses to update its local copy of the file.

Figure 3B:
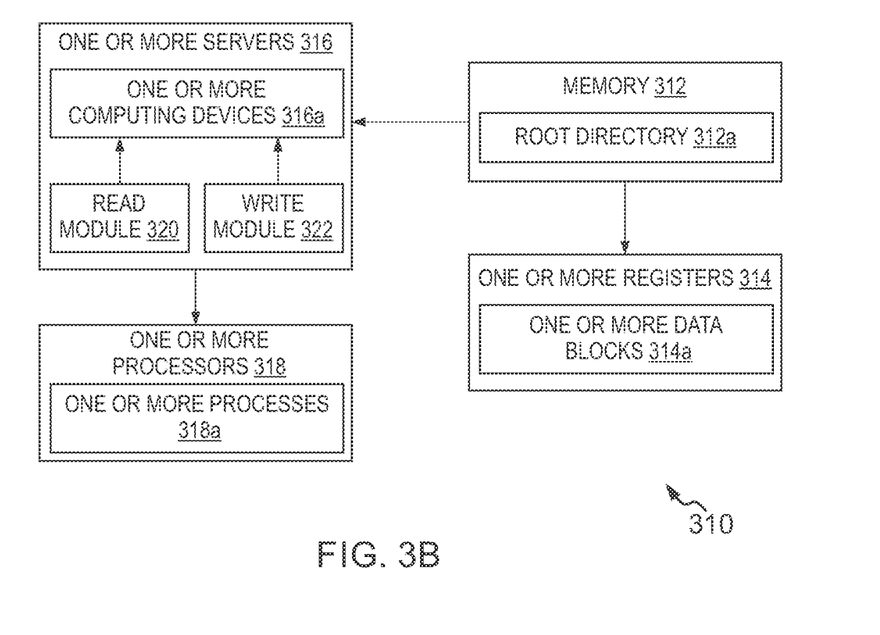
FIG. 3B is a block diagram representation of a system implementing the distributed computing architecture based at least on a blocktree, in accordance with an embodiment of the present disclosure.

FIG. 3B is a block diagram representation of a system 310 implementing the distributed computing architecture based at least on a blocktree, in accordance with an embodiment of the present disclosure.

The system 310 includes a memory 312, one or more registers 314, one or more servers 316, and one or more processors 318. The system 310 is caused to run the one or more processors 318 to organize information and one or more computing devices 316a associated with a user into a hierarchical tree structure i.e., blocktree. The system 310 includes the memory 312 to store a root directory 312a to store an identifier associated with the owner of the hierarchical tree structure. The system 310 further includes the one or more registers 314 to store one or more data blocks 314a. The one or more data blocks 314a are configured to store the information. The one or more data blocks 314a include at least one of: files and directories. The system 310 also includes the one or more servers 316 (e.g., the servers 102a-102n) to represent the one or more computing devices 316a (e.g., the computing devices 104a-104n). Moreover, the system 310 includes the one or more processors 318 configured to run one or more processes 318a on the one or more servers 316.

The system 310 also includes a read module 320 embedded in each of the one or more servers 316 configured to perform a read operation on the one or more data blocks 314a. The system 310 also includes a write module 322 embedded in each of the one or more servers 316 configured to perform a write operation on the one or more data blocks 314a. The write operation is performed based, at least in part, on cryptographic operations.

In an embodiment, each server stores a portion of the one or more data blocks associated with the user based, at least in part, on location of each server in the hierarchical tree structure. In an embodiment, the one or more processes 318a include a single computation running on the one or more computing devices 316a. In another embodiment, the one or more processes 318a include different computations running on the one or more computing devices 316a.

If a single computation is running on the one or more computing devices 316a, the system 310, with facilitation of the one or more processors 318, is caused to enable a process of the one or more processes 318a to write a sector of data to a corresponding file on a server of the one or more servers 316. Then, the system 310 is caused to generate a hash of the sector based, at least in part, on cryptographic operations. Further, the system 310 is caused to update a Merkle tree stored in metadata of the corresponding file based, at least in part, on the generated hash. Furthermore, the system 310 is caused to sign the metadata of the corresponding file based, at least in part, on a private signing key of the process of the one or more processes 318. Moreover, the system 310 is caused to create a new event based, at least in part, on the written sector and the metadata. Also, the system 310 is caused to transmit the new event to remaining servers of the one or more servers 316. The system 310 is also caused to agree on a state of the one or more data blocks 314a based, at least in part, on a Raft consensus protocol to synchronize contents of an individual data block on the one or more servers 316.

In an embodiment, each of the one or more data blocks 314a is associated with at least one of: body, metadata, and log. The log enables the one or more servers 316 (e.g., the servers 102a-102n) to synchronize the state of the individual data block of the one or more data blocks 314a based, at least in part, on the Raft consensus protocol. The metadata includes at least one of: inherit field, salt field, readcap field, writecap field, integrity field, signature field, merkle_tree field, and secret field. These metadata facilitate implementation of the cryptographic operations.

Figure 4:
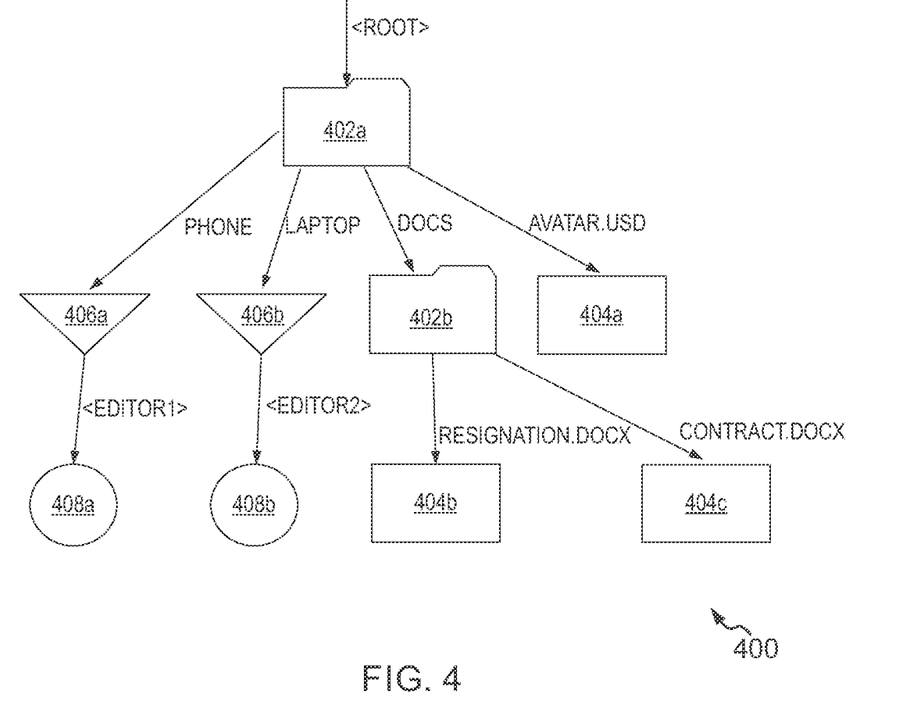
FIG. 4 is an exemplary representation of a blocktree of a user, in accordance with an embodiment of the present disclosure.

FIG. 4 is an exemplary representation 400 of a blocktree of a user, in accordance with an embodiment of the present disclosure.

With reference to FIG. 4, let us consider a user (not shown in figures) with two computing devices (e.g., the computing devices 104a and 104b) as a mobile phone and a laptop. The folder icons (see, 402a and 402b) represent directory root and directory docs respectively. In addition, the rectangle icons (see, 404a, 404b, and 404c) represent files "avatar.usd", "resignation.docx" and "contract.docx" respectively. Further, the inverted triangle icons (see, 406a and 406b) represent the computing devices (or the servers) (i.e., the phone and the laptop respectively). Furthermore, the circular icons (see, 408a and 408b) represent the processes or running programs (i.e., editor1 and editor2 respectively) on these computing devices. (as shown in FIG. 4)

With reference to FIG. 4, the names in the angular brackets are stand-ins for actual path components. For example, <root> is any valid first path component, such as: "0!dSip4J0kurN5VhVoaTipM-ywOOWrqJuRRVQ7aa-bew". The <root> component is used to identify the owner of the blocktree. In addition, the <editor1> and the <editor2> components are the process identifiers of the running processes. The process identifiers are assigned by the servers (e.g., the servers 102a-102n) on which these processes are running. In one implementation, the process identifiers can only include non-negative integers.

Exemplary Read/Write Implementation:

As shown in FIG. 4, the blocktree includes the two servers (i.e., 406a and 406b). The server 406a represents the user's phone and the server 406b represents the user's laptop. The folder 402a represents the root directory for the blocktree of the user. Since the root directory includes both the servers 406a-406b, both the servers 406a-406b store a copy of all the data blocks (e.g., the one or more data blocks) in this directory. This is herein referred to as "data locality mechanism".

The file "avatar.usd" is intended to be read by anyone, so it is not encrypted. The remaining directories and files are private, and thus, they are stored in the encrypted format. The two circular icons (see, 408a and 408b) represent two processes running the same document editing application. The processes 408a and 408b represent that the file "contract.docx" is being edited.

In one implementation, the servers agree on the state of the one or more data blocks they store based, at least in part, on Raft consensus protocol. In general, Raft is a consensus algorithm that is specially designed to deal with fault tolerance problem in distributed systems. Let us suppose that the user makes an edit to the file "contract.docx" using its laptop. The process on the user's laptop then writes a sector of data to the file. This sector of data is encrypted, then hashed, and this hash is then used to update a Merkle tree over the file's data. The root of this Merkle tree is stored in the block's metadata.

This metadata is then signed using a private signing key of the laptop, and an event is created with the written sector and the new metadata. This event is then transmitted to the user's phone, according to the rules of the Raft consensus protocol. Assuming that the phone has not seen any conflicting writes, it accepts the event into its own log for the file. Then, both the servers 406a-406b commit the change to their respective copies of the file. Since the editor process on the phone is displaying the document itself, it has subscribed to the write event for the file, and so when the write is committed by the phone, a message is sent to the process informing it of the write. The process reacts to this message by updating the display with the new data. The user can then see that the edit they performed using their laptop is now also reflected on their phone.

In this manner, the blocktree can be used to build a system providing the ubiquitous connectivity of a cloud application but in a way which only involves a user's own devices. In another example, the blocktree can be used for secure software distribution. The software package distributed via the blocktree can be protected against modification by the integrity protection provided by the system. Indeed, a client relying on the software package distributed via a blocktree has cryptographic assurance that the contents of the module are trusted by the owner of that blocktree. Thus, if they trust the owner of this blocktree, they have reason to trust the package.

Components of the Blocktree:

Principal: A principal is any entity that can be authenticated. The principal can include owners, servers, and processes. Each principal has cryptographic credentials associated with it. The cryptographic credentials include two public-private key pairs, namely signing pair and encryption pair. In the signing pair, the private key is used to produce digital signatures and the public key is used to verify them. In the encryption pair, the private key is used to decrypt data and the public key is used to encrypt it.

The principal is identified by a cryptographic hash of their public signing key. The resulting hash data is referred to as a hash of the principal. The blocktree supports multiple hash algorithms (described below) and each supported algorithm is assigned a non-negative integer to identify it. All the hash data in the system is prepended by a 64-bit unsigned integer representation of this integer. This facilitates the evolvability of the system by allowing new hash algorithms to be added in the future. The following table provides the standard hash algorithms and their indices:

0. SHA2 256
1. SHA2 512

In some embodiments, the system performs symmetric key encryption (e.g., Advanced Encryption Standard (AES)), public key encryption (e.g., RSAES-OAEP), public key digital signatures (e.g., RSASSA-PSS), and the like. The system uses the Raft consensus algorithm for synchronizing the writes between the servers in the same directory.

To produce a textual identifier for a principal, its hash is computed. In one implementation, Base64Url encoding is used to encode the binary data into a string of text. Then, the base 10 representation of the identifier of the hash algorithm used and a delimiter is prepended to this string as:

<hash algorithm ID><delimiter><Base64Url(hash)>—

This textual representation is termed as a fingerprint of the principal. The public signing key and the public encryption key are referred to as the public credentials of the principal. Likewise, the private signing key and the private encryption key are referred to as the private credentials of the principal. The public credentials can be shared freely while the private credentials must never be shared.

A principal can be issued capabilities to allow it to read and write to the one or more data blocks in a blocktree. These read and write capabilities are created using the public credentials of the principal. Every blocktree is associated with a root principal whose credentials can be used to issue capabilities to read and write any data block in the hierarchical tree structure. The public signing key of these root credentials is used to create identifiers for the blocktree (explained below).

Blocks: There are four types of blocks, namely files, directories, servers (e.g., the servers 102a-102n), and processes. The files represent arbitrary collections of data. The directories represent indices which keep track of their children. The servers represent the computing systems participating in the blocktree. The processes represent programs running on the servers.

The files and the directories are collectively termed as the data blocks. Each individual data block includes at least one of: (a) body, (b) metadata, and (c) log. The term "body" herein represents a sequence of bytes. In one implementation, the system manages the body of a directory. The body of a file is managed by the user code. The term "metadata" herein may represent additional data associated with an individual data block that is managed by the system and used to implement the cryptographic access control. The term "log" herein may represent a sequence of events that describes how the body of the individual data block came to be in its current state.

In an embodiment, the body of the individual data block can be encrypted using a symmetric key cipher. The key used is termed as the block key. The body of the individual data block is also subject to integrity protection based at least on a Merkle tree. The metadata of the individual data block is always stored unencrypted; however, it is integrity protected based at least on a digital signature.

The log of the individual data block enables the servers to synchronize the state of the individual data block based at least on the Raft consensus protocol to agree on the entries in the log. The events must be stored in the log until they are applied, after which they can be purged to save space. In case the events are saved, it is possible for the state of the block at some point in the past to be reconstructed by starting from an empty block and applying each of the events in the log up to any point in time.

The metadata is associated with each individual data block. The metadata includes data fields. The data fields include at least one of:
  inherit: represents the cipher text of the block key resulting from encrypting it using the parent block key, or if this block is not encrypted, a flag indicating this field is empty.
  salt: represents an array of random data which is unique to this block.
  readcaps: represents a dictionary of readcaps where the keys are computed by hashing the concatenation of the principal the readcap is issued to and the salt field.
  writecap: represents a certificate chain.
  integrity: represents the root of a Merkle tree over the body of the individual data block. If the body of the individual data block is encrypted, then this the tree is over the ciphertext.
  signature: represents a signature over fields 1-5 (inclusive) which is made using the private key corresponding to the public key in the first certificate in writecap.
  merkle_tree: represents a Merkle tree over the body of the individual data block.
  secret: represents the ciphertext of the confidential metadata struct made by encrypting it using the block key.

The above stated data fields define the structure of the metadata. The metadata only includes the data fields and no other information. It should be noted that the names of the data fields are only used as a reference, and the data fields can be stored in any order in the metadata.

The metadata for the individual data block is considered as valid only if: (i) the writecap can be successfully verified, (ii) the path of the individual data block is contained in the path of the first certificate in the writecap, (iii) the signature in the metadata can be successfully verified using the public key in the first certificate in the writecap, and (iv) the integrity value in the individual data block header matches the root in the "merkle_tree". Once the verification of the metadata is done, the contents of the metadata are trusted by the corresponding server.

The "secret" field contains an encryption of the "secret metadata" data structure which contains at least the following fields:
  readcap_owners: represent a dictionary where the keys are equal to the keys which are stored in the "metadata.readcaps" dictionary, and where each value is an identifier for the principal that a readcap was issued to. This enables readcaps to be reissued during key rotations.
  mode: represents an unsigned 32-bit integer, used to store the operating system mode bits for the individual data block.
  uid: represents an unsigned 32-bit integer, used to store the user identifier (UID) of the operating system owner of the individual data block.
  gid: represents an unsigned 32-bit integer, used to store the group identifier (GID) of the operating system owner of the individual data block.
  custom: represents a dictionary of custom user defined metadata, where keys are UTF-8 encoded strings and values are byte arrays.
  Path: A path corresponds to a textual identifier of the individual data block. In addition, structure of the path reflects the position of the individual data block in the hierarchy of the blocktree. The data blocks that have children are termed as directories, and the data they include consists of an index, which in turn, allows their children to be accessed. The entries in the index bind a name to a child block. The path can be defined inductively as follows:

In one example, if the owner of a blocktree has a fingerprint "<fingerprint>", then a root path to their blocktree is "/<fingerprint>". It is to be noted that there is one such path for every hash algorithm supported by the system, all of which are valid.

In another example, if a directory has path "<P>" and a child of the directory is bound to the name "<name>", then the path of the child is "<P>/<name>". It is noted that if one path is a prefix of the second path, then the second path is contained in the first.

Certificate: A certificate herein represents a data structure that conveys the authority to write to a given path. The certificate includes at least the following fields:
  issued_to: represents a hash of the principal who was issued this certificate, as well as the identifier of the algorithm used to produce this hash.
  path: represents the path this certificate can be used to write to.
  signing_key: represents the public key of the issuer of this certificate.
  signature: represents a digital signature which is produced using the private key which corresponds to the public key. The signature is computed over all other fields.

The blocktree also includes "writecaps" and "readcaps".
  Writecaps: A writecap (also termed as write capability) is a certificate chain extending back to the owner of the blocktree. The "signing_key" of each certificate matches the principal that its successor was issued to, and the final certificate is self-signed by the owner of the blocktree. The term "self-signed" herein may represent that the "signing_key" matches the "issued_to" field in the same certificate. Given a certificate in a writecap, the certificate that comes after it (if it exists) is called its successor. It is noted that each certificate has a path, and the path of each certificate is included in the path of its successor. A writecap is only valid if all the following are satisfied for each certificate in it:

(i) The signature on the certificate verifies successfully using the "signing_key" field in the certificate.
(ii) If there is a successor, its path must contain the path of the current certificate.
(iii) If there is a successor, the hash of the public key in the current certificate computed using the hash algorithm specified in the "issued_to" field of the successor, must match the hash in the successor's "issued_to" field, and (iv) If there is no successor, the certificate must be self-signed by the owner (i.e., the user), which means that the public key in it must be the owner's public key.Readcaps: A read capability (also termed as readcap), is a ciphertext produced using the public encryption key of the principal it is issued to. The readcaps for the individual data block are stored in the metadata. It is noted that if a principal has been issued a readcap to a data block, then any block stored under that data block can also be read, because the block key of every child block is encrypted using its parent's key, and the resulting ciphertext is stored in each child's metadata in the inherit field.

It is noted that the readcap for the root principal of the blocktree is always stored in its root directory. This, in turn, ensures that the root credentials can always to be used to issue readcaps to other principals. Any server of the servers can determine if it has a readcap for a data block, and obtain the key for the data block, using the following procedure for each of the standard conventional hash algorithms:

1. The server computes the hash of its public signing key using current standard conventional hash algorithm.
2. The server then hashes the concatenation of the previously computed hash and the "metadata.salt" field.
3. Further, the server uses the resulting data to look for an entry in the "metadata.readcap" dictionary.
4. In case a value is found, then the server actually has a readcap. The server then uses its private encryption key to decrypt the value, the result of which is the block key. Thus, the server does not repeat this procedure with another standard hash algorithm. In case no value is found, then the server repeats this procedure with the next available standard hash algorithm.

In case the server was unable to find an entry in the "metadata.readcaps" using any of the standard hash algorithms, then the server does not have a readcap for the corresponding data block.

It is noted that the server must itself have a readcap for the data block in order to be able to issue its own readcap to a different principal. Considering that the server itself has the readcap, it performs the following procedure to issue one:

The server retrieves the public credentials of the principal it's issuing to (referred to as issuee) by contacting another server of the servers that represents it. The server then obtains the block key. In addition, the server encrypts the block key using the public encryption key of the issuee. Further, the server stores the result in the "metadata.readcaps" dictionary under a key computed by taking the principal's public signing key, hashing it, then hashing the concatenation of the result and the "metadata.salt" field.

Furthermore, the server uses the block key to decrypt "metadata.secret", obtaining the structure of "secret_metadata". The server then adds an entry under the key computed to the "secret_metadata.readcap_owners" dictionary, whose value is an identifier for the issuee. Moreover, the server encrypts "secret_metadata" using the block key and stores the result in the "metadata.secret" field.

In order to rotate the key for a data block, the "metadata.secret" field is decrypted to obtain the "secret_metadata" structure. The public encryption keys of each of the principals in "secret_metadata.readcap_owner" are retrieved. Then, a new block key is generated. Further, each of the values stored in the metadata's readcap dictionary is overwritten by a new ciphertext created by encrypting the new block key using the corresponding principals' public encryption key.

Key rotation for a given data block can only be performed by a server which has access to the parent block's key.

In case the read access to an individual data block is to be revoked from a principal, then the following procedure is performed:

1. The readcap to be revoked is deleted from the "metadata.readcaps" dictionary.
2. The key rotation procedure is performed.

Figure 5:
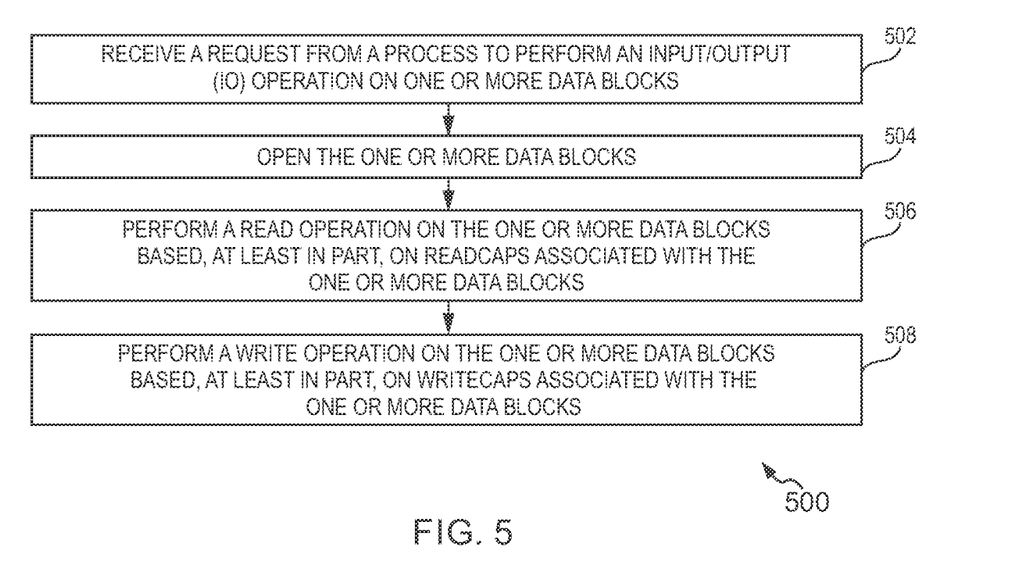
FIG. 5 is a data flow diagram representation for performing distributed computing based at least on the blocktree, in accordance with an embodiment of the present disclosure.

FIG. 5 is a data flow diagram representation 500 for performing distributed computing based at least on the blocktree, in accordance with an embodiment of the present disclosure. The sequence of operations of the representation 500 may not be necessarily executed in the same order as they are presented. Further, one or more operations may be grouped together and performed in form of a single step, or one operation may have several sub-steps that may be performed in parallel or in a sequential manner.

At operation 502, the method includes receiving a request from a process of the one or more processes 318a to perform an input/output (IO) operation on the one or more data blocks 314a.

At operation 504, the method includes opening the one or more data blocks 314a.

At operation 506, the method includes optionally performing the read operation on the one or more data blocks 314a based, at least in part, on the readcaps associated with the one or more data blocks 314a.

At operation 508, the method includes optionally performing the write operation on the one or more data blocks 314a based, at least in part, on the writecaps associated with the one or more data blocks 314a.

The sequence of operations of the representation 500 need not to be necessarily executed in the same order as they are presented. Further, one or more operations may be grouped together and performed in form of a single step, or one operation may have several sub-steps that may be performed in parallel or in a sequential manner.

Figure 6:
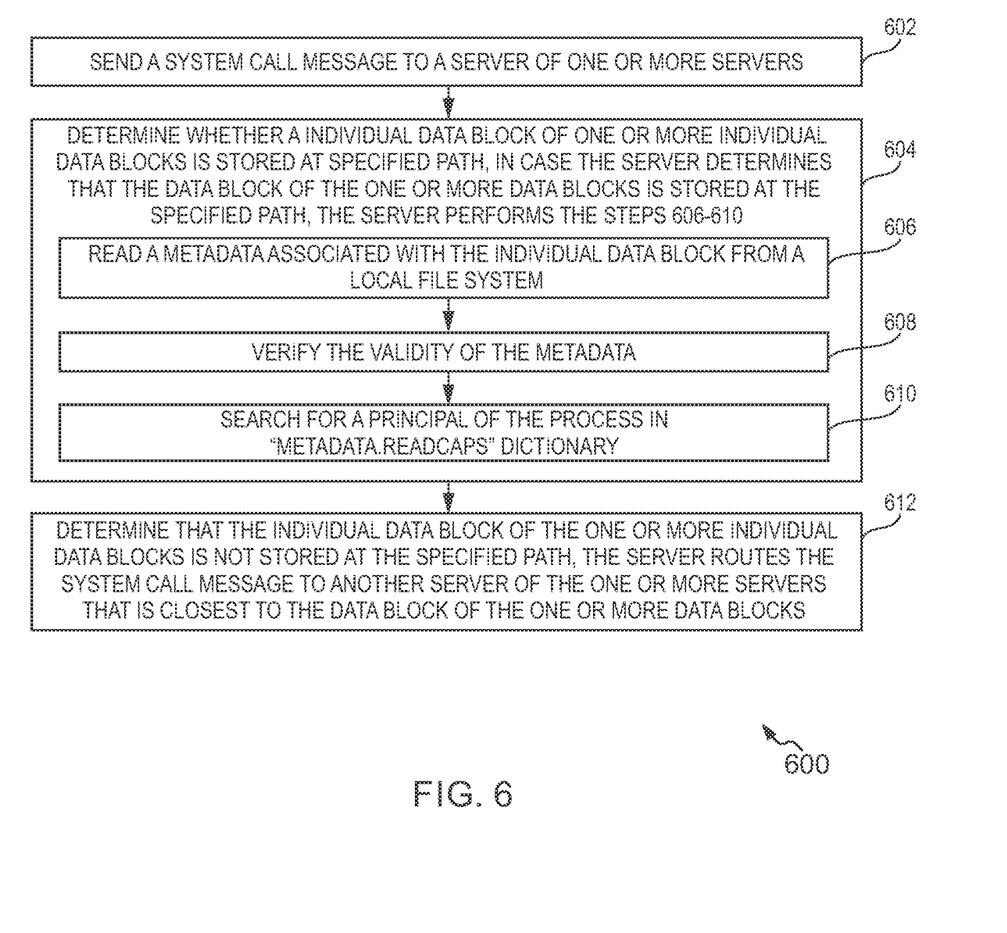
FIG. 6 represents a sequence flow diagram of a process flow for opening an individual data block of one or more data blocks, in accordance with an embodiment of the present disclosure.

FIG. 6 is a data flow diagram representation 600 for opening the individual data block of the one or more data blocks 314a, in accordance with an embodiment of the present disclosure. The sequence of operations of the sequence flow diagram 600 may not be necessarily executed in the same order as they are presented. Further, one or more operations may be grouped together and performed in form of a single step, or one operation may have several sub-steps that may be performed in parallel or in a sequential manner.

If a process wishes to perform input/output (IO) on a given data block (e.g., the individual data block), the process must first open the individual data block. At operation 602, the method includes sending a system call message to a server of the one or more servers (e.g., the servers 102a-102n). The server then specifies the path of the individual data block of the one or more data blocks 314a.

At operation 604, the method includes determining whether the individual data block of the one or more data blocks 314a is stored on the server currently processing the system call message. In case the individual data block of the one or more data blocks 314a is stored on this server, the method described in the steps 606-610 is performed.

At operation 606, the method includes reading the metadata associated with the individual data block from a local file system.

At operation 608, the method includes verifying the validity of the metadata.

At operation 610, the method includes searching for the principal of the process in the "metadata.readcaps" dictionary. If no readcap is found, then an error is returned to the process. Otherwise, the block key is obtained and stored in the memory 312 during the entire time the file is kept open.

In case the individual data block of the one or more data blocks 314a is not stored on the server currently processing the system call message, at operation 612, the method includes routing the system call message to another server of the one or more servers 316 that is closest to the individual data block of the one or more data blocks 314a.

The sequence of operations of the flow diagram 600 need not be necessarily executed in the same order as they are presented. Further, one or more operations may be grouped together and performed in form of a single step, or one operation may have several sub-steps that may be performed in parallel or in sequential manner.

Figure 7:
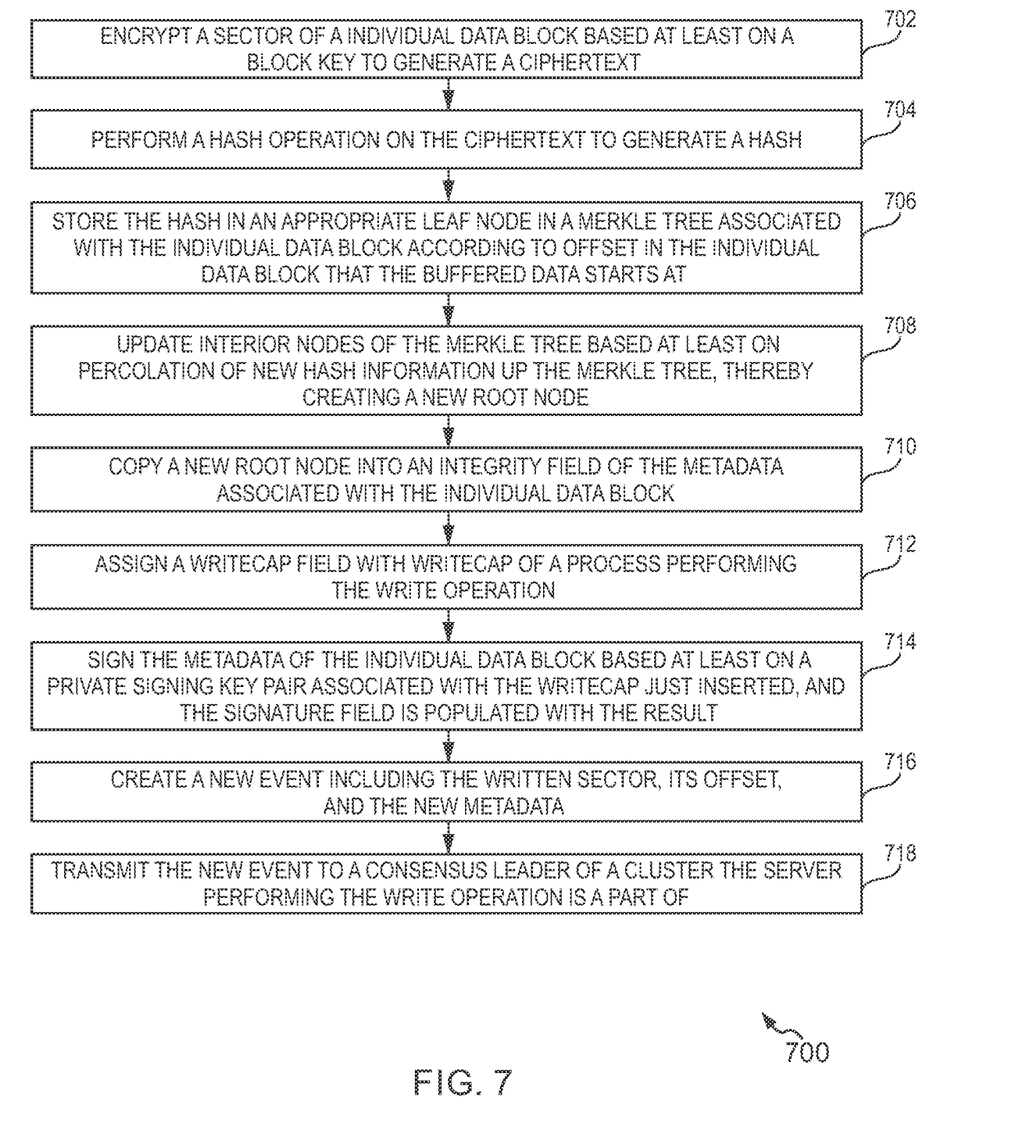
FIG. 7 represents a sequence flow diagram of a process flow for performing a write operation on the individual data block of the one or more data blocks, in accordance with an embodiment of the present disclosure.

FIG. 7 is a data flow diagram representation 700 for performing the write operation on the individual data block of the one or more data blocks 314a, in accordance with an embodiment of the present disclosure. The sequence of operations of the sequence flow diagram 700 may not be necessarily executed in the same order as they are presented. Further, one or more operations may be grouped together and performed in form of a single step, or one operation may have several sub-steps that may be performed in parallel or in a sequential manner.

The body of an individual data block is broken up into units called sectors. Every sector in the individual data block is of the same size. In addition, the size of every sector in the individual data block can be configured when the individual data block is created. However, it is noted that the size of the sector cannot be changed for an existing block. When a process writes data into an individual data block, it is buffered until its ciphertext will fill an entire sector, or until the process chooses to flush the buffered data.

At operation 702, the method includes encrypting a sector of the individual data block based at least on the block key to generate the ciphertext. It is noted that if the block is not encrypted, then the buffered data is passed along as the ciphertext.

At operation 704, the method includes performing a hash operation on the ciphertext to generate a hash.

At operation 706, the method includes storing the hash in an appropriate leaf node in a Merkle tree associated with the individual data block according to the offset in the individual data block that the buffered data starts at.

At operation 708, the method includes updating interior nodes of the Merkle tree based at least on percolating new hash information up the Merkle tree, thereby creating a new root node.

At operation 710, the method includes copying the new root node into an integrity field of the metadata associated with the individual data block.

At operation 712, the method includes assigning a writecap field with the writecap of a process performing the write operation.

At operation 714, the method includes signing the metadata of the individual data block based at least on the private signing key associated with the writecap just inserted, and the signature field is populated with the result.

At operation 716, the method includes creating a new event including the written sector, its offset, and the new metadata.

At operation 718, the method includes transmitting the new event to a consensus leader of a cluster that the server performing the write operation is a part of. It is noted that if a server is alone in its directory, then the server is the consensus leader.

If the event is accepted by the leader, then the server commits it by writing it out to the body of the individual data block (which could be stored in a file in the local file system of the server) and it sends a reply to the process which initiated the write informing it that the write operation was successful. If the event is not accepted, then the server sends a reply to the initiating process informing it of the error. The process can then choose to retry the write operation.

The sequence of operations of the flow diagram 700 need not be necessarily executed in the same order as they are presented. Further, one or more operations may be grouped together and performed in form of a single step, or one operation may have several sub-steps that may be performed in parallel or in sequential manner.

Figure 8:
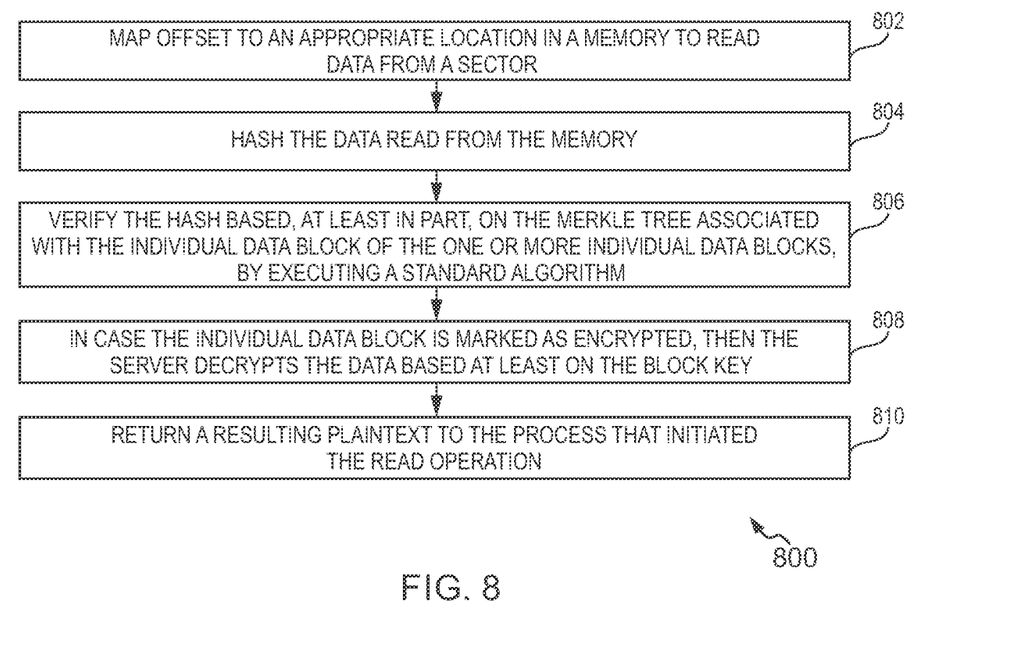
FIG. 8 represents a sequence flow diagram of a process flow for performing a read operation on the individual data block of the one or more data blocks, in accordance with an embodiment of the present disclosure.

FIG. 8 is a data flow diagram representation 800 for performing a read operation on the individual data block of the one or more data blocks 314a, in accordance with an embodiment of the present disclosure. The sequence of operations of the sequence flow diagram 800 may not be necessarily executed in the same order as they are presented. Further, one or more operations may be grouped together and performed in form of a single step, or one operation may have several sub-steps that may be performed in parallel or in a sequential manner. The process requests to initiate the read operation in the sector at a given offset.

At operation 802, the method includes mapping the offset to an appropriate location in the memory 312 to read data from a sector.

At operation 804, the method includes hashing the data read from the storage.

At operation 806, the method includes verifying the hash based, at least in part, on the Merkle tree associated with the individual data block of the one or more data blocks 314a, by executing the standard algorithm.

At operation 808, in case the individual data block is marked as encrypted, the method includes decrypting the data based at least on the block key.

At operation 810, the method includes returning a resulting plaintext to the process that initiated the read operation.

It is noted that read operation is responded to by using the most recent state of the individual data block known to the server. In other words, there could be pending writes in the log of the individual data block which have not yet been applied. Therefore, such writes are not visible to the process performing the read until they are applied.

The sequence of operations of the flow diagram 800 need not be necessarily executed in the same order as they are presented. Further, one or more operations may be grouped together and performed in form of a single step, or one operation may have several sub-steps that may be performed in parallel or in a sequential manner.

The blocktree accomplishes various advantages over the prior arts: (1) the blocktree enables interoperability between DApps, and (2) the blocktree creates an open market for cloud and edge computing resources. The blocktree is not only a distributed file system, but also a program runtime environment with a global addressing scheme which allows programs running anywhere in the world to communicate by passing messages. Along with the data locality mechanism, the blocktree allows computations on a particular set of data to be distributed to the servers which are closest to that data.

Various embodiments of the present disclosure provide a system that enables secure storage, verification, and replication of data. The system enables the partitioning of file system write operations over a hierarchy of servers, thus allowing the write performance to scale beyond the capabilities of a single machine. Moreover, the system utilizes the file system to manage data placement that means that applications are able to move data from the cloud to edge as required. As mentioned above, the system moves the data closer to the user, thereby resulting in real-time performance boost.

The system enables the read and write capabilities to be managed per file system object, allowing for fine-grained access control. In addition, such capabilities are hereditary, which means that a capability for a directory gives the owner the same capability for every file and directory that it contains either directly or indirectly. This approach is both intuitive and flexible and allows for access control to be evolved over time. Secondly, by moving cryptographic operations onto the client side, data no longer needs to be encrypted twice in order to be protected during transit and at rest.

The blocktree also solves the problem of relocating data between the servers by allowing this to be done using standard file system operations. With the blocktree, such operations are handled by the platform itself, thereby reducing latency by moving data to the edge or even onto a user's own device.

Figure 9:
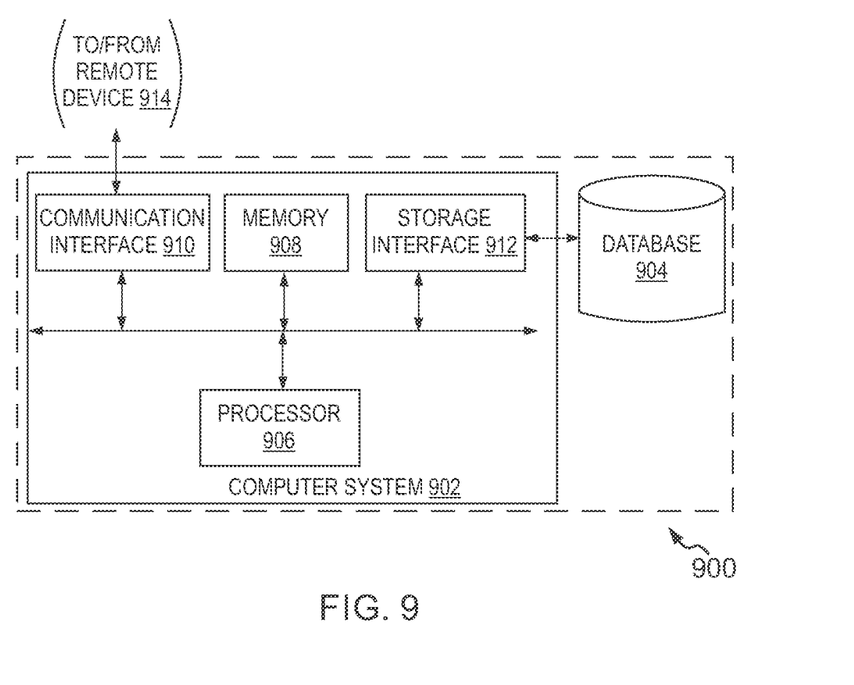
FIG. 9 is a simplified block diagram of a server, in accordance with an embodiment of the present disclosure.

FIG. 9 is a simplified block diagram of a server 900, in accordance with an embodiment of the present disclosure. The server 900 shows hardware configuration of the server (e.g., the servers 102a-102n). The server 900 includes a computer system 902 and a database 904.

The computer system 902 includes at least one processor 906 configured to execute executable instructions for providing various features of the present disclosure. The executing instructions are stored in a memory 908. The components of the computer system 902 provided herein may not be exhaustive and the computer system 902 may include more or fewer components than those depicted in FIG. 9. Further, two or more components may be embodied in one single component, and/or one component may be configured using multiple sub-components to achieve the desired functionalities. Some components of the computer system 902 may be configured using hardware elements, software elements, firmware elements, and/or a combination thereof.

The processor 906 is operatively coupled to a communication interface 910 such that the computer system 902 is capable of communicating with a remote device 914 such as the server 102a of FIG. 1 or communicating with any entity connected to the network 106 (shown in FIG. 1) or any constituents of the server 102. In an example, the processor 906 may be capable of receiving a request from a process to perform an IO operation on one or more data blocks 314a.

In some embodiments, the database 904 is integrated into the computer system 902. For example, the computer system 902 may include one or more hard disk drives as the database 904. The storage interface 912 is any component capable of providing the processor 906 with access to the database 904. The storage interface 912 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 906 with access to the database 904.

The disclosed methods with reference to FIGS. 5-8, or one or more operations of the server 900 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server 900 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system for organizing information and a plurality of computing devices associated with a user into a hierarchical tree structure, the system comprising:
   a memory storing a root directory configured to store an identifier associated with an owner of the hierarchical tree structure;
   one or more registers storing one or more data blocks, the one or more data blocks configured to store the information, wherein the one or more data blocks comprise at least one of: files and directories;
   a plurality of servers to represent the plurality of computing devices, wherein each server of the plurality of servers represents a computing device of the plurality of computing devices; and
   one or more processors configured to run one or more processes on the plurality of servers,
   wherein the each server of the plurality of servers stores a portion of the one or more data blocks associated with the user based, at least in part, on location of the each server of the plurality of servers in the hierarchical tree structure;
   wherein the system, with facilitation of the one or more processors, is caused to:
   enable a process of the one or more processes to write a sector of data to a corresponding file on a server of the plurality of servers;
   generate a hash of the sector based, at least in part, on cryptographic operations; and
   update a Merkle tree stored in metadata of the corresponding file based, at least in part, on the generated hash.

2. The system as claimed in claim 1, further comprising:
   a read module embedded in the each server of the plurality of servers configured to perform a read operation on the one or more data blocks.

3. The system as claimed in claim 1, further comprising:
   a write module embedded in the each server of the plurality of servers configured to perform a write operation on the one or more data blocks, wherein the write operation is performed based, at least in part, on cryptographic operations.

4. The system as claimed in claim 1, wherein the one or more processes comprise different computations running on the plurality of computing devices.

5. The system as claimed in claim 1, wherein the one or more processes comprise a single computation running on the plurality of computing devices.

6. The system as claimed in claim 5, wherein if the single computation is running on the plurality of computing devices, the system, with facilitation of the one or more processors, is caused to:
   sign the metadata of the corresponding file based, at least in part, on a private signing key of the server of the plurality of servers;
   create a new event based, at least in part, on the written sector and the metadata;
   transmit the new event to remaining servers of the plurality of servers; and
   agree on a state of the one or more data blocks based, at least in part, on a Raft consensus protocol to synchronize contents of a data block of the one or more data blocks on the plurality of servers.

7. The system as claimed in claim 1, wherein each of the one or more data blocks is associated with at least one of: body, metadata, and log.

8. The system as claimed in claim 7, wherein the log enables the plurality of servers to synchronize state of the data block of the one or more data blocks based, at least in part, on the Raft consensus protocol.

9. The system as claimed in claim 7, wherein the metadata comprises at least one of: inherit field, salt field, readcap field, writecap field, integrity field, signature field, merkle tree field, and secret field, wherein the metadata facilitates implementation of cryptographic operations.

* * * * *